United States Patent Office 3,370,097
Patented Feb. 20, 1968

3,370,097
PROCESS FOR THE PRODUCTION OF ALKYLATED AROMATIC HYDROXY COMPOUNDS
Willi Hahn, Cologne-Stammheim, Germany, assignor to Farbenfabriken Bayer Aktiengesellschaft, Leverkusen, Germany, a corporation of Germany
No Drawing. Filed Apr. 25, 1961, Ser. No. 105,307
Claims priority, application Germany, May 4, 1960, F 31,157
11 Claims. (Cl. 260—619)

This invention relates to an improved process for the production of alkyl phenols from aromatic hydroxy compounds and olefins with the aid of metal oxides.

It is known that alkyl phenols can be prepared by reacting phenols with olefins in the presence of catalysts.

Serving in such cases as catalysts are primarily compounds of an acid nature, such as sulphuric acid, hydrochloric acid, pohsphoric acid, acidly reacting salts, bleaching earths activated by acids and the like. In addition, Lewis acids (for example aluminium chloride and boron fluoride) can also be used. All these catalysts have the disadvantage of having a strong corroding action and thus necessitate the use of special materials for the vessel, and in addition generally lead to mixtures of different alkylation products. The removal of the catalysts from the reaction mixture often presents considerable difficulties. Furthermore, metal phenolates have been proposed in German patent specification No. 944,014 as catalysts for alkylation on the nucleus. It is true that they are less corrosive, but the removal of such a catalyst from the alkylation mixture involves considerable technical expense, and in addition the use of acids for splitting the metal phenolates must be avoided due to their isomerising action on the reaction products.

The object of the present invention is to provide a special process for the alkylation of aromatic hydroxy compounds. Another object is to provide a process for the alkylation of aromatic hydroxy compounds capable of being carried out in simple apparatus without any danger of corrosion. Yet another object of the invention consists in that the catalyst which is used can be separated in a simple manner from the reaction products. Finally, yet another object is that the catalyst used is suitable for the production of fixed bed catalysts and thus the alkylation process can also be conducted continuously in simple manner.

Further objects will be apparent from the specification and the examples.

It has now been found that alkylated aromatic hydroxy compounds are obtained in a simple manner and with good yields by reacting aromatic hydroxy compounds with olefins in the presence of a catalyst, if oxides of the metals of groups 5–A, 6–A, or 8 of the Periodic System (Mendeleeff) are used as catalyst and perhaps if the operation takes place in the presence of a solvent. With this reaction, the alkyl groups occurs almost exclusively in the nucleus.

It is extremely surprising and was not to be expected in any way that the alkylation reaction can be conducted by means of metal oxides of the groups 5–A, 6–A, or 8 of the Periodic System. It was unknown that metal oxides catalyse such an alkylation reaction. The hitherto known catalysts are strongly acid compounds or metal compounds of the phenols. However, the metal oxides used according to the invention are not in any way acid and also do not react with the phenols. They do in fact remain completely unchanged.

Aromatic hydroxy compounds, i.e., phenolic compounds, suitable for the process are the monohydroxy and polyhydroxy compounds of the mononuclear and polynuclear aromatic systems. It is necessary that at least one o-position, related to a hydroxyl group, or the p-position, carries a hydrogen atom and thus can be substituted. These aromatic hydroxy compounds can be substituted by alkyl, aryl, cycloalkyl and alkoxy groups and also by halogen atoms. However, they should not contain any pronounced electronegative substituents, such as the nitro, carboxyl or sulphonic acid groups.

Particularly suitable are the aromatic hydroxy compounds which if necessary are substituted in the manner indicated above and which one ring, or two or three condensed aromatic rings. Some compounds which are especially suitable for the reaction according to the invention are phenol, the cresols, the chlorophenols, resorcinol, the naphthols, alkyl naphthols and mono- or di-hydroxy anthracene.

Generally suitable as olefinic components are unsaturated compounds of the aliphatic, alicyclic and araliphatic series with olefinic double bonds.

Mentioned as typical representatives of these components are ethylene, propylene, isobutylene, butylene and diisobutylene, as well as cyclohexene and styrene.

In certain cases, for example when using hydroxy compounds of high melting point or sensitive hydroxy compounds, it can be advantageous to work in a diluent. Suitable diluents of this type are inter alia hydrocarbons of the aliphatic, hydroaromatic and aromatic series; however, other conventional solvents can also be used, provided they are neutral with respect to the reaction components, as is the case with chlorinated hydrocarbons. To be mentioned as specific examples are: benzene, toluene, xylene, cyclohexane, n-heptane, carbon tetrachloride and dichlorobenzene.

The catalysts effective for the process according to the invention are the oxides of the metals of the groups 5–A, 6–A, and 8 of the Periodic System of the elements. Since, as is known, these metals can occur in several valency stages, sometimes different oxides of the individual elements can exist. In principle, it is possible successfully to use all these compounds, but generally it is the oxides which are derived from the most stable oxidation stage which are most suitable. For example, chromium-III-oxide has a greater catalytic activity for the alkylation by the process of the invention than chromium-VI-oxide. On the other hand, the stable oxides of pentavalent vanadium and columbium are highly efficient. The oxides of the 5th and 6th group which are especially suitable are the oxides of vanadium, columbium, chromium, molybdenum and tungsten. However, oxides of the metals of the 8th group, such as the oxides of nickel, iron and platinum, are also suitable as catalysts.

Catalysts which are applied to support materials are particularly suitable. Mentioned as examples of such supporting components are aluminium oxide, silicates, active carbon and generally materials with a high specific surface. In this form, the oxides frequently have a greater efficacy than the compact pure substance.

The most favourable reaction temperature is different for the individual reactants. A temperature range of from 100 to 400° C. and especially from 150–320° C. will generally be used, but lower or even higher temperatures can also be employed. The pressure in the reaction vessel can fluctuate within wide limits. It is advantageous to work under a pressure which is higher than the natural pressure of the reaction components at the temperature concerned. The lower limits of the pressures are established by the natural pressures at the corresponding temperatures, and the upper limits are in practice determined only by the vessels which are used. Accordingly, taking into consideration economic points of view, pressures from 5 to 500 atmospheres, preferably 50 to 200 atmospheres, are considered.

The process according to the invention is so carried out that the oxide catalyst in finely divided form is added to the aromatic hydroxy compound to be alkylated and then the alkylation agent is introduced at elevated temperatures. Since the reaction is performed in the liquid phase, it is necessary to work under elevated pressure in suitable pressure vessels. In order to achieve a thorough mixing of gas and liquid and also a uniform distribution of the catalyst in the material being reacted, it is advantageous for the contents of the autoclave to be stirred mechanically or to be shaken.

The ratio between hydroxy compound and olefin differs from case to case. It depends on both the initial compounds and above all on the alkylation product which is required. If it is intended only to introduce one alkyl radical into the compound to be alkylated, a ratio in the region of 1:1 will generally be selected. Alkylation by several alkyl radicals can be effected with excess olefin. The reactants in this case are then likewise introduced in approximately molar ratios, corresponding to the degree of alkylation.

The quantity of catalyst to be used depends on the individual reaction components and the form in which the oxide is employed. Generally speaking, quantities of from 0.01–10% of the oxide, related to the hydroxy compound to be alkylated, will be used. It is particularly advantageous to work with 0.1–5.0%. In certain cases, mixtures of different metal oxides from the 5th and 6th secondary group and also of the 8th group can also produce particularly good results.

The alkylate is worked up in a simple manner by filtering off the catalyst, which if necessary can be used again for fresh mixtures. The conventional separation methods, such as fractional distillation, crystallisation and the like, are suitable for isolating the pure alkylation products.

The process can be carried out batchwise or continuously. When operating continuously, the catalyst in finely divided form, together with the compound to be alkylated, is pumped through the reactor and olefin is simultaneously added. Another form of the continuous process is the conduction of the liquid or dissolved reactants over the catalyst arranged in a fixed bed.

There are predominantly aromatic hydroxy compounds alkylated in the nucleus which are obtained by the process according to the invention. In particular, substitution occurs at the free o-position and p-position to the hydroxyl group. Under suitable conditions, the compounds which are monosubstituted in the o-position can be made the main products of the reaction. High reaction temperatures favour p-substitution and low temperatures the o-substitution.

The process of the invention makes it possible for alkylated aromatic hydroxy compounds to be prepared by reacting olefins with phenols. The particular technical advantage over other known processes consists in the freedom from corrosion of the catalysts which are used, and also above all in the fact that they can easily be removed from the reaction products by filtration. In addition, the readily available catalysts, when operating intermittently, can if necessary be repeatedly used. Furthermore, they are also suitable for the production of fixed bed catalysts.

The alkylated compounds which are readily obtainable by the process are valuable antioxidants and stabilisers. Furthermore, they can be used as intermediate products for the production of compounds for these purposes, and also for the production of pest control agents and dyestuffs.

The invention is further disclosed in the following examples which are illustrative but not limitative thereof.

*Example 1*

To 282 parts by weight of phenol there are added 10 parts by weight of a powdered catalyst consisting of vanadium pentoxide on a silica support (such as is used for example for the oxidation of naphthalene to phthalic acid anhydride), and this mixture is treated in a stirrer-type autoclave at 280–300° C. with 126 parts by weight of propylene. The pressure in the reaction vessel falls over a period of 5 hours from 220 to 70 atm. The catalyst is filtered off after cooling and releasing the pressure of the autoclave. There are obtained 346 parts by weight of a liquid reaction product, which has the following composition, determined by gas chromatography:

Phenol 41.5%; o-isopropyl phenol 40.3%; 2,6-diisopropyl phenol 8.9%; p-isopropyl phenol 1.0%; 2,4-diisopropyl phenol and 2,4,6-triisobutyl phenol, together, below 1%; phenyl alkyl ether 7.4%.

The yield of 2-isopropyl phenol is 72% of the theoretical of the conversion.

The three first-mentioned components can be obtained in pure form by fractional distillation.

*Example 2*

If the process of Example 1 is carried out with the same quantities of phenol and propylene, but using 10 parts by weight of molybdenum-VI-oxide as catalyst, the reaction starts at 250° C. After a reaction period of 6 hours, there are obtained 390 parts by weight of liquid reaction material of the following composition: phenol 29.5%; o-isopropyl phenol 41.2%; 2,6-diisopropyl phenol 7.4%; p-isoproyl phenol 10.5%; 2,4-diisopropyl phenol 2.0%; triisopropyl phenol 1.0%; ether 8.4%.

*Example 3*

200 parts by weight of phenol are reacted with 120 parts by weight of propylene in the presence of 10 parts by weight of chromium-III-oxide at 280–300° C. in a stirrer-type autoclave. If the reaction is stopped after 4 hours and the catalyst is filtered off the liquid alkylation mixture (246 parts by weight) consists of 63% of unchanged phenol, 28% of o-isopropyl phenol and 8% of 2,6-diisopropyl phenol. The content of other isomers is below 1%.

*Example 4*

10 parts by weight of a chromium oxide-aluminum oxide catalyst (composition 15% $Cr_2O_3$, 80% $Al_2O_3$, 5% $SiO_2$) are used for the alkylation of phenol with propylene. From 282 parts by weight of phenol and 126 parts by weight of propylene and after a reaction period of 3 hours at 300° C., during which there is a fall in pressure from 140–35 atm. in the reaction vessel, 370 parts by weight of liquid alkylate are obtained. This consists of 41% phenol, 45% o-isopropyl phenol, 6% 2,6-diisopropyl phenol, 3% p-isopropyl phenol and 5% O-alkylation products.

Practically all the phenol can be reacted with excess olefin. A mixture of 200 parts by weight of phenol and 20 parts by weight of the catalyst yields 357 parts by weight of alkylate after stirring for 5 hours at 300° C. under a propylene pressure of 200 atm., this alkylate still containing only 3% of phenol. The main products are o-isopropyl phenol and 2,6-diisopropyl phenol (41% and 33% respectively of the alkylate). In addition, there are formed 10% of p-isopropyl phenol and smaller quantities of 2,4-diisopropyl phenol and 2,4,6-triisopropyl phenol as well as a little ether.

*Example 5*

188 parts by weight of phenol are heated to 300° C. with 10 parts by weight of the catalyst used in Example 4 and then 112 parts by weight of industrial n-butene are pumped into the reaction vessel by means of a proportioning pump. The initial pressure of 74 atm. falls to 50 atm. over a period of 4 hours. After releasing the pressure of the autoclave at room temperature and filtering off the catalyst, there remain 241 parts by weight of alkylate with 64% phenol and 26% o-sec.-butyl phenol (B.P.$_{50}$: 135° C., phenyl urethane M.P. 86° C.).

Example 6

Using the process of Example 5, 200 parts by weight of phenol are reacted at 280° C. with 150 parts by weight of isobutylene in the presence of 10 parts by weight of the chromium oxide-aluminium oxide catalyst. After a reaction period of 3 hours, the usual working up produces 307 parts by weight of alkylate with 34% phenol, 23% o-tert.-butyl phenol (B.P.$_{50}$: 137° C.), 30% p-tert.-butyl phenol (B.P.$_{50}$: 149° C.), 10% 2,4-di-tert.-butyl phenol (B.P.$_{50}$: 169° C.) and a small quantity of 2,6-di-tert.-butyl phenol.

Example 7

After 6 hours, the reaction of 200 parts by weight of phenol with ethylene in the presence of 20 parts by weight of chromium oxide-aluminium oxide catalyst at 300° C./250 atm. produces 270 parts by weight of a liquid reaction product, consisting of one third each of phenol, o-ethyl phenol and higher alkylation products.

Example 8

126 parts by weight of propylene are caused to act at 300° C. on 282 parts by weight of phenol in the presence of 10 parts by weight of columbium-V-oxide. The pressure falls over a period of 6 hours from 265 to 85 atm. After cooling, the pressure is released and the catalyst filtered off. 353 parts by weight of liquid reaction product are obtained, containing 60% phenol, 27% o-isopropyl phenol and 8% 2,6-diisopropyl phenol as well as a small quantity of p-substitution products.

The use of 10 parts by weight of tungsten-VI-oxide as catalyst in the above mixture leads to the same results under the same reaction conditions.

Example 9

By reacting 282 parts by weight of phenol with 126 parts by weight of propylene at 230–280° C. in the presence of 10 parts by weight of iron-III-oxide in the manner already described, the pressure falls over a period of 5 hours from 240 atm. to 82 atm. As well as unchanged phenol, 130 parts by weight of o-isopropyl phenol and 30 parts by weight of 2,6-diisopropyl phenol are obtained.

Example 10

By impregnating a granular aluminium oxide with an aqueous nickel nitrate solution, drying at 150° C. and decomposing the nitrate in a stream of air at 500 to 510° C., a catalyst of nickel oxide on aluminium oxide is prepared (content 2.2% NiO). 282 parts by weight of phenol are heated with 15 parts by weight of this catalyst in powder form in a stirrer-type autoclave to 300° C. and 126 parts by weight of propylene are pumped in. After 1 hour, the pressure has fallen from initially 120 atm. to 18 atm. The alkylate (393 parts by weight) freed from the catalyst by filtration consists of 27.8% by weight of phenol, 62.0% of o-isopropyl phenol, 6.9% of 2,6-diisopropyl phenol and 2.3% of p-isopropyl phenol.

Example 11

Using the process of Example 10, 282 parts by weight of phenol are reacted at 300° C. with 126 parts by weight of propylene in the presence of 0.6 part by weight of cobalt oxide which is applied to an aluminium oxide support. After a reaction period of 3 hours, 402 parts by weight of liquid reaction product have formed, consisting of 66.5% of o-isopropyl phenol and containing, in addition to 20% of phenol and 11.6% of 2,6-diisopropyl phenol, only traces of p-substitution products.

Example 12

188 parts by weight of phenol and 164 parts by weight of cyclohexane are heated for 4 hours to 250–300° C. in a stirrer-type autoclave with 10 parts by weight of the chromium oxide-aluminium oxide catalyst described in Example 4. The 340 g. of liquid reaction mixture contain about 60% of phenol and 40% of o-cyclohexyl phenol (B.P.: 148° C./10 mm. Hg:M.P. 57° C.).

Example 13

188 parts by weight of phenol and 20 parts by weight of a powdered catalyst consisting of 2.8% of chromium oxide on aluminium oxide, which is prepared similarly to Example 10 from chromium nitrate and aluminium oxide, are heated in a stirrer-type autoclave to 280° C. 236 parts by weight of α-methyl styrene are pumped into the mixture, which is thereafter stirred for 3 hours at 300° C. After cooling and releasing the pressure of the autoclave, 438 parts by weight of reaction mixture are obtained, and this is filtered off from the catalyst and fractionally distilled. Of the reacted phenol (60%), 20% are present as o-cumyl phenol (B.P. 161–163° C./10 mm. Hg) and 70% as p-cumyl phenol (B.P.: 186° C./10 mm. Hg M.P. 70–71.5° C.).

Example 14

324 parts by weight of o-cresol and 20 parts by weight of the chromium oxide catalyst according to Example 4 are heated in an autoclave to 280° C. and then 126 parts by weight of propylene are forced in under pressure, using a liquid pump. The temperature is slowly raised to 300° C. The fall in pressure is terminated after 3 hours. The liquid reaction product (410 parts by weight) is filtered off from the catalyst. It contains 30% of unchanged starting material, 60% of 2-methyl-6-isopropyl phenol (B.P.: 100° C./10 mm. Hg) as well as a small quantity of p-substituted and disubstituted products.

Example 15

180 parts by weight of isobutylene are pumped into a mixture of 216 parts by weight of p-cresol and 20 parts by weight of a powered molybdenum oxide-aluminium oxide catalyst (3.05%), the mixture being at a temperature of 280° C. The pressure in the reaction vessel falls by 100 atm. on subsequent stirring for 3 hours. The catalyst is removed from the reaction mixture (402 parts by weight) by filtration. The alkylate consists of 25% of unchanged cresol and contains 60% of 4-methyl-2-tert.-butyl phenol (B.P.: 111° C./10 mm. Hg) as well as 15% of 4-methyl-2,6-di-tert.-butyl phenol.

Example 16

330 parts by weight of resorcinol are heated with 10 parts by weight of molybdenum oxide and 126 parts by weight of propylene for 6 hours to 250° C. The reaction product (420 parts by weight) is dissolved in benzene, the catalyst is filtered off and the monoisopropyl resorcinol which is formed (M.P. 94–96° C.) is separated by fractional crystallisation from the unchanged starting material.

Example 17

200 parts by weight of hydroquinone are heated with 10 parts by weight of the catalyst described in Example 4 in an autoclave and while stirring to 280° C. After 200 parts by weight of propylene have been pumped in by means of a proportioning pump and after raising the temperature to 300° C., a pressure of 300 atm. is set up in the reaction vessel, this pressure falling in 195 minutes to 85 atm. The reaction mixture (348 parts by weight), solidifies on cooling and contains mainly 2,5-diisopropyl hydroquinone (M.P. 148–149° C.) and 2-isopropyl hydroquinone (M.P. 130–133° C.) as well as some unchanged hydroquinone. The two alkyl hydroquinones, because of the more readily water-solubility of the monoisopropyl compound, can be separated by treatment with a mixture of benzene and water.

Example 18

144 parts by weight of α-naphthol, 100 parts by weight of toluene and 10 parts by weight of the chromium oxide-aluminium oxide catalyst according to Example 4 are heated in an autoclave to 230° C. and 84 parts by weight of propylene are pumped in. The temperature is then raised to 280° C. and the mixture stirred for 3 hours at this temperature. The consumption of olefin can be detected from the decrease in pressure. The reaction product (298 parts by weight) freed from the catalyst by filtration is distilled in vacuo, first of all the toluene distilling over and then, after first runnings at 150–163° C./10 mm. Hg, the main fraction distills over at 163–165° C./10 mm. Hg (140 parts by weight). The product crystallises from ligroin and melts at 48–50° C. From the analysis and the melting point of its phenyl urethane (159–161° C.), the product is shown to be 2-isopropyl-1-naphthol.

*Example 19*

257 parts by weight of m-chlorophenol are heated with 10 parts by weight of the chromium oxide catalyst (see Example 4) to 250° C. in an autoclave and then 84 parts by weight of propylene are pumped in. Stirring then takes place for 4 hours at 280° C., the major part of the olefin being consumed. The usual working up of the reaction product (332 parts by weight) leaves about 30% of the chlorophenol introduced in unchanged form. The reacted m-chlorophenol has changed into approximately equal parts of 2-isopropyl-5-chlorophenol (B.P.$_{10}$: 118° C.) and 2,6-diiso-propyl-3-chlorophenol (B.P.: 134° C./10 mm. Hg).

*Example 20*

282 parts by weight of phenol are heated with 15 parts by weight of a catalyst consisting of molybdenum oxide on active carbon (10.5% MoO$_3$) to 280° C. and 126 parts by weight of propylene are pumped into the reaction vessel. After stirring for 3 hours at 280° C., the liquid reaction product (343 parts by weight) is found to contain 61% of phenol, 30% of o-isopropyl phenol and 3% of 2,6-diisopropyl phenol. The remaining 6% are made up of p-alkylated products and phenol ether.

*Example 21*

In order that the propylation of phenol can be carried out continuously, two series-connected pressure vessels are each three-quarters filled with chromium oxide on aluminium oxide (4 mm. grain, 15% Cr$_2$O$_3$) and heated to 290–300° C. A continuous stream of phenol and propylene (ratio by weight 2:1) is then fed into the first of the two pressure vessels. By means of a pneumatically controlled regulator valve, such a quantity of product is released from the second reaction vessel that a constant pressure of 100 atm. is maintained in the reaction space. With a throughput of 1 part by weight of phenol to 2 parts by weight of catalyst mass and per hour, there is obtained by this working method an alkylate having the composition: 30% by weight of phenol, 50% by weight of o-isopropyl phenol, 11% by weight of 2,6-diisopropyl phenol, 4% by weight of p-isopropyl phenol, 3% by weight of isopropyl phenyl ether and 2% by weight of more highly alkylated phenols.

The composition can be varied by changing the phenol-olefin ratio, the reaction temperature and the pressure.

I claim:
1. A process for the catalytic alkylation of phenolic compounds which comprises contacting a phenolic compound unsubstituted in at least one of the positions ortho and para with respect to the phenolic hydroxy group, with an olefin in the presence of metal oxide as catalyst, said metal oxide being selected from the group consisting of oxides of metals of groups 5–A, 6–A, and 8, to alkylate the phenolic compound in a position initially unsubstituted as aforesaid.

2. A process for the catalytic alkylation of phenolic compounds which comprises contacting a phenolic compound unsubstituted in at least one of the positions ortho and para with respect to the phenolic hydroxy group, with an olefin of a series selected from the groups consisting of aliphatic, alicyclic, and araliphatic, in the presence of a metal oxide as catalyst, the metal oxide selected from the group consisting of oxides of metals of groups 5–A, 6–A, and 8, said contacting being at a temperature of about 100–400° C. for liquid reaction to alkylate the phenolic compound in a position initially unsubstituted as aforesaid.

3. A process according to claim 2 wherein the amount of the catalyst is 0.01–10% of the phenolic compound.

4. A process according to claim 2 wherein an inert solvent is employed as a reaction medium.

5. A process according to claim 2 wherein the metal oxide catalyst is supported on a carried therefor.

6. A process according to claim 5 wherein the metal oxide is chromium oxide and is supported on aluminum oxide.

7. A process according to claim 2 wherein the metal oxide is an oxide of vanadium.

8. A process according to claim 2 wherein the metal oxide is an oxide of columbium.

9. A process according to claim 2, wherein the metal oxide is an oxide of chromium.

10. A process according to claim 2 wherein the metal oxide is an oxide of molybdenum.

11. A process according to claim 2 wherein the metal oxide is an oxide of tungsten.

References Cited

UNITED STATES PATENTS

| | | | |
|---|---|---|---|
| 2,054,270 | 9/1936 | Schoeller et al. | 260—624 |
| 2,448,942 | 9/1948 | Winkler et al. | 260—624 |
| 2,572,019 | 10/1951 | Fawcett et al. | 260—624 |
| 2,202,877 | 6/1940 | Stevens et al. | 260—624 X |
| 2,435,087 | 1/1948 | Luten, et al. | 260—624 X |
| 2,572,300 | 10/1951 | Fawcett et al. | 260—624 |

FOREIGN PATENTS 746,407   3/1956   Great Britain.

LEON ZITVER, *Primary Examiner.*

HAROLD G. MOORE, *Examiner.*

H. ROBERTS, D. M. HELFER, *Assistant Examiners.*